March 4, 1947. H. E. MILLER 2,416,937
POTATO HARVESTER WITH VINE LIFTER
Filed July 18, 1945
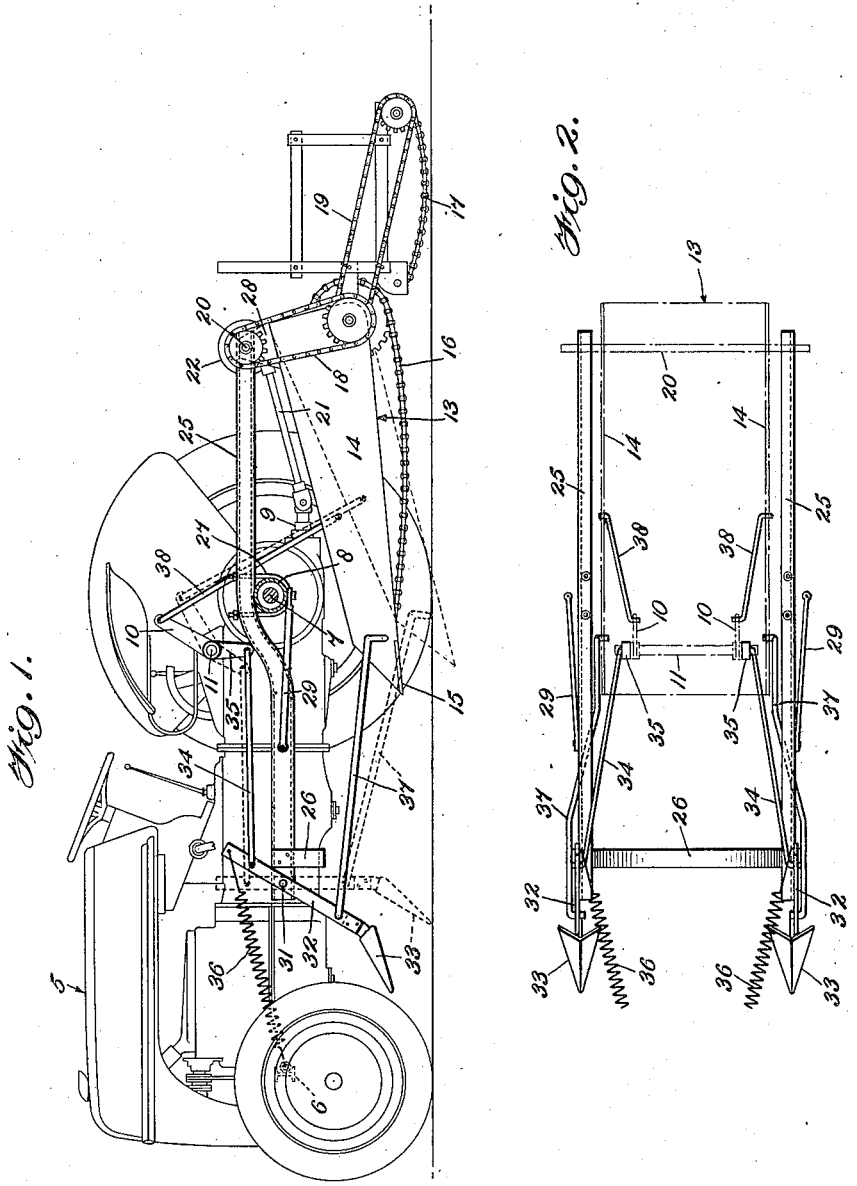
Inventor
Henry E. Miller;
By
B.B.Collings
Attorney Patented Mar. 4, 1947

2,416,937

UNITED STATES PATENT OFFICE 2,416,937

POTATO HARVESTER WITH VINE LIFTER

Henry E. Miller, Menan, Idaho

Application July 18, 1945, Serial No. 605,654

5 Claims. (Cl. 55—51)

1

The invention relates to harvesters, such for example as potato diggers, and has for one of its objects to provide simple and relatively inexpensive means whereby such a machine may be readily attached to and carried by a farm tractor, with elimination of the necessity for supporting or ground-engaging wheels on the harvester itself.

A further object of the invention is to provide apparatus of the class described wherein the harvester may be connected to the power lift mechanism with which most present day tractors are provided, whereby the penetration of the digging blade of the harvester may be readily varied and whereby the harvester may be raised completely out of engagement with the ground during travel to and from the field.

A still further object of the invention is to provide tractor carried and operated potato harvesting apparatus and the like having vine engaging elements for lifting and/or cutting the vines, which elements are also connected to the power lift mechanism of the tractor for raising and lowering simultaneously with similar movements of the harvester proper.

With the above and other objects in view which will appear as the description proceeds, the invention resides in the novel details of construction and the novel combinations and arrangements of parts more fully hereinafter described and particularly pointed out in the appended claims.

A typical example of the invention is illustrated in the accompanying drawing forming a part of this specification, in which Figure 1 is a side elevational view, partly broken away and in section, showing a conventional type of potato digger mounted upon a well known form of tractor by means according to the invention; and Fig. 2 is a plan view of the mounting means and the connections whereby the harvester and the vine element may be raised and lowered by the power lift mechanism of the tractor.

In the said drawing, the tractor 5 is of a conventional type having a front axle 6, a rear axle 7 enclosed by a housing 8, a power take-off 9, and a pair of power lift arms 10 carried by a shaft 11 operable at will by either mechanical or hydraulic means. The harvester unit 13 is likewise of a well known form, comprising a frame including side plates 14, a digging blade 15 at its forward end, and a pair of slatted endless belts 16 and 17 driven by chain and sprocket drives 18 and 19 from a shaft 20. The shaft 20 is driven

2 from the power take-off 9 through a shaft 21 and appropriate gearing enclosed in a housing 22.

The means for mounting the harvester on the tractor comprises a pair of longitudinal frame members 25, here shown as of channel iron, disposed one to either side of the tractor body, and attached adjacent their forward ends to a band 26 which passes beneath and is secured to the said body. The mid portions of the frame members rest upon the rear axle housing 8 of the tractor, to which they may be secured as by U-bolts 27, and the rear portions of the said members project rearwardly of the tractor and mount the shaft 20 and housing 22, on the latter of which the harvester frame may be pivotally mounted for vertical swinging movements, as by ears 28. The frame members 25 are further attached to the axle housing 8 by thrust rods or braces 29.

The forward end portion of each frame member 25 has pivotally mounted on it, as at 31, an oscillatory member such as a lever 32 which may carry at its lower end a vine lifting element 33, such as a plow-like blade, disk or the like. The upper portion of each lever 32 is connected by a rod or cable 34 to an arm 35, which arms are rigidly mounted on the power lift shaft 11 of the tractor adjacent the conventional lift arms 10. If desired, the arms 35 may be attached to and constitute angular extensions of the arms 10. Tension springs 36 extend between the upper ends of the levers 32 and the front axle 6 or other relatively fixed part of the tractor, and the lower ends of the said levers are connected by cables or draw bars 37 to the blade 15 or to the forward portion of the harvester frame or side plates 14 adjacent such blade. The mid portion of the said plates or frame is connected by rods or links 38 to the conventional arms 10 of the tractor power lift mechanism.

In Fig. 1 the parts are shown in full lines in the inoperative positions they occupy when the machine is being driven to or from the field of operation. When it is desired to render them operative, the control for the power lift mechanism of the tractor is operated to cause or permit its shaft 11 to turn in a clockwise direction, as viewed in Fig. 1. This motion is transmitted by the arms 35, rods 34, levers 32 and draw bars 37 to the harvester blade or frame, resulting in movement of the various parts to the dotted line positions, thus bringing the harvester blade into engagement with the ground and simultaneously lowering the vine lifting elements 33 to their operative positions. The springs 36 assist in or assure this movement, particularly where the lift mechanism of the tractor is of the single acting type wherein the action of the fluid pressure is to turn the shaft 11 counterclockwise to lift apparatus attached to arms 10, with reverse movement being accomplished through the weight of the apparatus by gravity action upon release of the fluid.

The rods or links 38 aid in lifting the harvester unit 13 when the arms 10 are moved back to their full line position, and also serve as braces to relieve strain on the connections 34, 32 and 37 especially when the machine is operating in hard or dry earth. Obviously, by proper control of the lift mechanism of the tractor, the depth to which the blade 15 penetrates the ground may be varied as desired.

The draw bars 37 also serve to prevent the vines lifted by the elements 33 from catching on the sides 14 of the harvester unit.

What is claimed is:

1. In a potato or like harvesting machine, comprising a harvester unit and a tractor having a power actuated lift mechanism: a frame having forward portions secured to the body of the tractor and rearward portions pivotally supporting the harvester unit for vertical swinging movements; an oscillatory member mounted on the forward portions of said frame; operating connections between said oscillatory member and the tractor lift mechanism; and connections between the oscillatory member and the harvester unit whereby the latter may be swung vertically in response to actuation of the lift mechanism.

2. In a potato or like harvesting machine, comprising a harvester unit and a tractor having a power actuated lift mechanism: a frame having forward portions secured to the body of the tractor and rearward portions pivotally supporting the harvester unit for vertical swinging movements; an oscillatory member mounted on the forward portions of said frame; operating connections between said oscillatory member and the tractor lift mechanism; connections between the oscillatory member and the harvester unit whereby the latter may be swung vertically in response to actuation of the lift mechanism; and resilient means connected to and acting upon said oscillating member, for assisting and assuring downward swinging movements of the harvester unit.

3. In a potato or like harvesting machine, comprising a harvester unit and a tractor having a power actuated lift mechanism: a frame having forward portions secured to the body of the tractor and rearward portions pivotally supporting the harvester unit for vertical swinging movements; oscillatory members mounted on the forward portions of said frame; operating connections between said oscillatory members and the tractor lift mechanism; connections between the oscillatory members and the harvester unit whereby the latter may be swung vertically in response to actuation of the lift mechanism; and direct connections between the harvester unit and lift mechanism for relieving strain upon the previously mentioned connections.

4. In a potato harvesting or like machine, comprising a harvester unit and a tractor having a power actuated lift mechanism: longitudinal frame members having forward portions secured to the body of the tractor and rearward portions pivotally supporting the harvester unit for vertical swinging movements; oscillatory members mounted on the forward portions of said frame members; vine-engaging elements carried by said oscillatory members; operating connections between the oscillatory members and the tractor lift mechanism whereby said members may be swung to move the vine-engaging elements to and from operative position; and connections between the oscillatory members and harvester unit whereby the latter may be swung to and from operative position simultaneously with like movements of the vine-engaging elements.

5. In a potato or like harvesting machine, comprising a harvester unit and a tractor having a power actuated lift mechanism including an arm: a frame having forward portions secured to the body of the tractor and rearward portions pivotally supporting the harvester unit for vertical swinging movements; levers pivotally mounted on the forward portions of said frame; vine-engaging elements carried by said levers; operating connections between said levers and the tractor lift mechanism whereby the vine-engaging elements may be moved to and from operative position; connections between the levers and the harvester unit whereby the latter may be moved to and from operative position simultaneously with like movements of the vine-engaging elements; and links connecting the harvester unit and said lift arm for relieving strain on said connections and aiding in swinging movements of the harvester unit.

HENRY E. MILLER.

REFERENCES CITED

The following references are of record in the file of this patent:

UNITED STATES PATENTS

| Number | Name | Date |
|---|---|---|
| 1,282,657 | Tussing | Oct. 22, 1918 |
| 1,816,999 | Ensminger | Aug. 4, 1931 |
| 1,921,190 | Johnson | Aug. 8, 1933 |
| 76,953 | St. John | Apr. 21, 1868 |
| 1,868,307 | Brown | July 19, 1932 |